(12) United States Patent
Chiu

(10) Patent No.: US 7,643,697 B2
(45) Date of Patent: Jan. 5, 2010

(54) ACCELERATIVE NOISE FILTERING METHOD FOR IMAGE DATA

(76) Inventor: Chui-Kuei Chiu, 215, Sec. 1, Heng-Shant St., Heng-Shan Tsun, Heng-Shan Hsiang, Hsin-Chu (TW)

( * ) Notice: Subject to any disclaimer, the term of this patent is extended or adjusted under 35 U.S.C. 154(b) by 120 days.

(21) Appl. No.: 11/505,550

(22) Filed: Aug. 16, 2006

(65) Prior Publication Data
US 2006/0285765 A1 Dec. 21, 2006

Related U.S. Application Data

(63) Continuation of application No. 10/255,965, filed on Sep. 27, 2002, now Pat. No. 7,203,378.

(51) Int. Cl.
G06K 9/40 (2006.01)
H04N 5/00 (2006.01)
(52) U.S. Cl. ...................... 382/261; 382/260
(58) Field of Classification Search ......... 382/260–264, 382/203, 205, 254, 270; 348/607, 701; 327/311, 327/552
See application file for complete search history.

(56) References Cited

U.S. PATENT DOCUMENTS

| 5,550,936 | A | * | 8/1996 | Someya et al. ............. 382/263 |
| 5,663,764 | A | | 9/1997 | Kondo et al. |
| 5,959,693 | A | | 9/1999 | Wu et al. |
| 6,094,511 | A | * | 7/2000 | Metcalfe et al. ............. 382/260 |
| 6,151,410 | A | | 11/2000 | Kuwata et al. |
| 6,332,136 | B1 | * | 12/2001 | Di Giura et al. ............... 706/1 |
| 2003/0021489 | A1 | | 1/2003 | Miura et al. |

* cited by examiner

Primary Examiner—Yon Couso
(74) Attorney, Agent, or Firm—Stolowitz Ford Cowger LLP

(57) ABSTRACT

An accelerative noise filtering method for image data is provided. The present invention includes selecting four neighboring pixels around a target pixel in a pattern of a cross shape or X shape, and calculating the absolute value of a difference between the target pixel and each of the four neighboring pixels. When the absolute value of the difference of the neighboring pixel is not larger than a standard deviation, a binary value of a bit corresponding to the neighboring pixel is set "1". When the absolute value of the difference of the neighboring pixel is larger than a standard deviation, a binary value of a bit corresponding to the neighboring pixel is set "0". Consequently, a 4-bit mapping table including the binary values of the four neighboring pixels is obtained. Then, a new pixel value for replacing the target pixel value is calculated based on a calculation derived from the 4-bit mapping table.

18 Claims, 3 Drawing Sheets

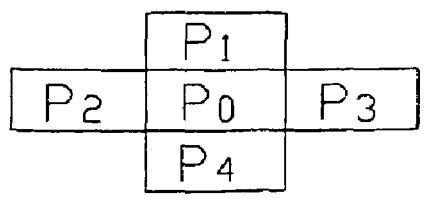
FIG.2A
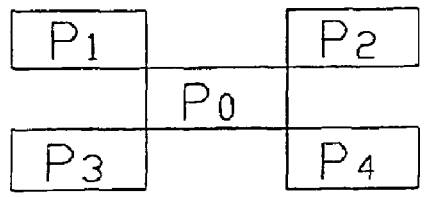
FIG.2B
Table(I)
| Case | P1 | P2 | P3 | P4 |
|---|---|---|---|---|
| 0 | 0 | 0 | 0 | 0 |
| 1 | 0 | 0 | 1 | 0 |
| 2 | 0 | 0 | 0 | 1 |
| 3 | 0 | 0 | 1 | 1 |
| 4 | 0 | 1 | 0 | 0 |
| 5 | 0 | 1 | 1 | 0 |
| 6 | 0 | 1 | 0 | 1 |
| 7 | 0 | 1 | 1 | 1 |
| 8 | 1 | 0 | 0 | 0 |
| 9 | 1 | 0 | 1 | 0 |
| 10 | 1 | 0 | 0 | 1 |
| 11 | 1 | 0 | 1 | 1 |
| 12 | 1 | 1 | 0 | 0 |
| 13 | 1 | 1 | 1 | 0 |
| 14 | 1 | 1 | 0 | 1 |
| 15 | 1 | 1 | 1 | 1 |
FIG.3
Table(II)
| Case | P0 | P1 | P2 | P3 | P4 |
|---|---|---|---|---|---|
| 0 | 1 |  |  |  |  |
| 1 | 1/2 |  |  | 1/2 |  |
| 2 | 1/2 |  |  |  | 1/2 |
| 3 | 1/2 |  |  | 1/4 | 1/4 |
| 4 | 1/2 |  | 1/2 |  |  |
| 5 | 1/2 |  | 1/4 | 1/4 |  |
| 6 | 1/2 |  | 1/4 |  | 1/4 |
| 7 | 1/2 |  | 1/4 | 1/4 |  |
| 8 | 1/2 | 1/2 |  |  |  |
| 9 | 1/2 | 1/4 |  | 1/4 |  |
| 10 | 1/2 | 1/4 |  |  | 1/4 |
| 11 | 1/2 |  |  | 1/4 | 1/4 |
| 12 | 1/2 | 1/4 | 1/4 |  |  |
| 13 | 1/2 |  | 1/4 | 1/4 |  |
| 14 | 1/2 | 1/4 | 1/4 |  |  |
| 15 | 1/2 | 1/8 | 1/8 | 1/8 | 1/8 |
FIG.4

ACCELERATIVE NOISE FILTERING METHOD FOR IMAGE DATA

CROSS-REFERENCE TO RELATED APPLICATIONS

This is a Continuation Patent Application of U.S. patent application Ser. No. 10/255,965, filed Sep. 27, 2002 now U.S. Pat. No. 7,203,378.

BACKGROUND OF THE INVENTION

1. Field of the Invention

The present invention relates to a technology for processing image data. More particularly, the present invention relates to a method to for effectively and rapidly filtering noise generated when obtaining and coding image data.

2. Description of the Prior Art

At present, when high compression of image data is performed by means of image data coding, preprocessing and post-processing the image data is believed to be important.

Several schemes have been proposed to filter noise generated when obtaining and coding image data, such as median filter, MTM (modified trimmed mean) filter, FMH (FIR-median hybrid) filter, edge preserving smoothing filter, etc.

The median filter is a nonlinear recovering technology, which is designed to filter impulse type noises from the image, while preserving the edge. Usually the two-dimensional median filter uses a 3×3 or 5×5 rectangular mask to enclose the pixel to be filtered. For the median filtering method, the gray level of each pixel is replaced by the median of the gray levels in a neighborhood of that pixel, instead of by average. The median of a set of values is such that half the values in the set are less than m and half are greater than m. In order to perform median filtering in a neighborhood of a pixel, the values of the pixel and its neighbors are sorted to determine the median, and assign this value to the pixel.

MTM filters are a combination of the median filter and mean value filter. Consequently, they can overcome the disadvantage of the median filter and improving the noise suppressing effect. In the processing, the median is first derived. The mean value filter is then applied on the pixel having a value near it as the object, and the result is output. A topic to be solved is how to set the object range of the mean value filter in consideration of the characteristics of the image. Also, it has been pointed out that, compared with the conventional median filter, the edge portion becomes more blurred.

Just as MTM filters, FMH filters are also a combination of the median filter and the mean value filter. However, FMH filters differ from MTM filters in that a mean value filter is applied first. Also, the mask for the mean value filter has a directionality with quantization in 90° or 450°. Compared with MTM filters, they can suppress blurriness of the edge portion, and the amount of computation required can be reduced significantly.

The edge preserving smoothing filter is a type of selective smoothing filter. It performs adaptive switching of the mask according to the localized properties of the region. Several types of polygonal masks are initially defined. Then, the degree of the variation in the pixel value in the region corresponding to each mask is calculated. Then, among the masks, the mask with the smallest degree of variation of the pixel value is selected, and the mean value of the pixel value in the region corresponding to this mask is output. In this case, the noise can be suppressed while the edge is preserved. However, it has been pointed out that the fine texture is lost, which is a disadvantage.

The above conventional technologies utilize the mean value of the pixel values in the region corresponding to a mask the target pixel centered as the output of the target pixel. One of the known method for obtaining the mean value includes selecting eight neighboring pixels x, y, z, a, c, d, e, f around a target pixel b, i.e. the pixel to be filtered, and calculating an absolute value of a difference between the target pixel and each of the eight neighboring pixels. When the absolute value of the difference between the target pixel and one of the eight neighboring pixels is larger than a standard deviation, the neighboring pixel is abandoned, not putted in the mean value filtering computation. When the absolute value of the difference between the target pixel and one of the eight neighboring pixels is not larger than a standard deviation, the neighboring pixel is putted in the mean value filtering computation. Hence, there are several cases such as b'=average(xyzabcdef), b'=average(xyzb) and b'=average(bcdef) etc. to obtain the mean value of the target pixel value and the pixel values in the neighborhood thereof. In performing the noise filtering computation, it is possible to use 9, 8, 7 . . . etc. as the divisor. For example, when b'=average(xyzabcdef) is used to obtain the mean value of the pixel values, the divisor of each of the pixel values putted in the noise filtering computation is 9. The noise filtering computation would be complicated whether implemented using hardware, software or a combination of hardware and software, and consume much time.

Accordingly, it is an intention to provide a noise filtering method for image data, which can overcome the above drawbacks, and effectively and rapidly performs the noise filtering process for image data.

SUMMARY OF THE INVENTION

It is one objective of the present invention to provide an accelerative noise filtering method for image data, which selects neighboring pixels among four neighboring pixels around a target pixel, i.e. the pixel to be filtered, in a pattern of a cross shape or X shape according to the degree of similarity between the target pixel and the neighboring pixels. The selected neighboring pixels are putted in a noise filtering computation to obtain a new pixel value for replacing the target pixel. The noise filtering process of image data is thus simplified and accelerated.

It is another objective of the present invention to provide an accelerative noise filtering method for image data, which employs the binary index concept to determine the weightings of four neighboring pixels around the target pixel in a pattern of a cross shape or X shape so as to simply the noise filtering computation.

It is a further objective of the present invention to provide an accelerative noise filtering method for image data, which can be used for preprocessing an original image data.

In order to achieve the above objectives of this invention, the present invention provides an accelerative noise filtering method for image data. Image data are provided and a pixel to be filtered as a target pixel is selected from the image data. Then, selecting four neighboring pixels around the target pixel in a pattern of a cross shape or X shape from the image data. Calculating an absolute value of a difference between the target pixel and each of the four neighboring pixels. Comparing the absolute value of each difference with a standard deviation, when the absolute value of the difference is not larger than the standard deviation, setting a binary value of a bit corresponding to the neighboring pixel as "1", and while when the absolute value of the difference is larger than the standard deviation, setting a binary value of a bit corresponding to the neighboring pixel as "0", thereby establishing a 4-bit mapping table comprising the binary values of the four neighboring pixels. Calculating a new pixel value for replacing the target pixel value based on a calculation (I) derived from the 4-bit mapping table:

$$X_0' = \frac{\sum_{i=0}^{4} K_i X_i}{\sum_{i=0}^{4} K_i} \quad (I)$$

wherein $X_0$ represents the target pixel value and $X_0'$ represents the new pixel value, $X_1$ (i=1~4) represents the pixel value of one of the four neighboring pixels, $X_1$ belonging to a scan line preceding the scan line the target pixel value $X_0$ belonging to, $X_2$ and $X_3$ belonging to the same scan line with the target pixel value $X_0$, $X_2$ is the neighboring pixel value preceding the target pixel value $X_0$ and $X_3$ is the neighboring pixel value following the target pixel value $X_0$, and $X_4$ belonging to a scan line following the scan line the target pixel value $X_0$ belonging to, $K_i$ (i=0~4) is a weighting coefficient of one of the four neighboring pixels and the target pixel, when the binary value of the neighboring pixel is set as "0", the weighting coefficient $K_i$ thereof is set zero, and the neighboring pixels having the binary value "1" are provided with equivalent weighting coefficients. The present method for noise reduction substitutes a target pixel with a weighted average of the target pixel itself and four neighboring pixels around it in a pattern of a cross shape or X shape according to the degree of similarity between the target pixel and the neighboring pixels. The noise filtering computation of the present method is thus significantly simplified and the computation is accelerated.

BRIEF DESCRIPTION OF THE DRAWINGS

The objectives and features of the present invention as well as advantages thereof will become apparent from the following detailed description, considered in conjunction with the accompanying drawings.

FIG. 2A is a diagram illustrating an example of selection of a mask of the preferred embodiment of FIGS. 1A and 1B;

FIG. 2B is a diagram illustrating an example of selection of a mask of another preferred embodiment of the present invention;

FIG. 3 is a mapping table (I) illustrating possible cases applied in the present noise filtering method; and FIG. 4 is a mapping table (II) illustrating possible weightings of neighboring pixels around a target pixel utilized in a noise filtering computation of the present invention.

DESCRIPTION OF THE PREFERRED EMBODIMENT

The present invention provides an accelerative noise filtering method, which selects neighboring pixels of a target pixel, i.e. the pixel to be filtered, among four neighboring pixels around the target pixel in a pattern of a cross shape or X shape according to the degree of similarity between the target pixel and the neighboring pixels. Then, the selected neighboring pixels are putted into a noise filtering computation to obtain a new pixel value for replacing the target pixel value. The new pixel value is a weighted average of the pixel values of the target pixel and the selected neighboring pixels. By the present invention, the noise filtering computation is simplified to only use the module of shift and adder in hardware. Thus, the noise filtering process for image data is more simple and easier than the conventional filtering technologies. The computation time is significantly reduced.

The present invention will be described in detail in accordance with the following preferred embodiments and with reference to the accompanying drawings.

Figure 1A:
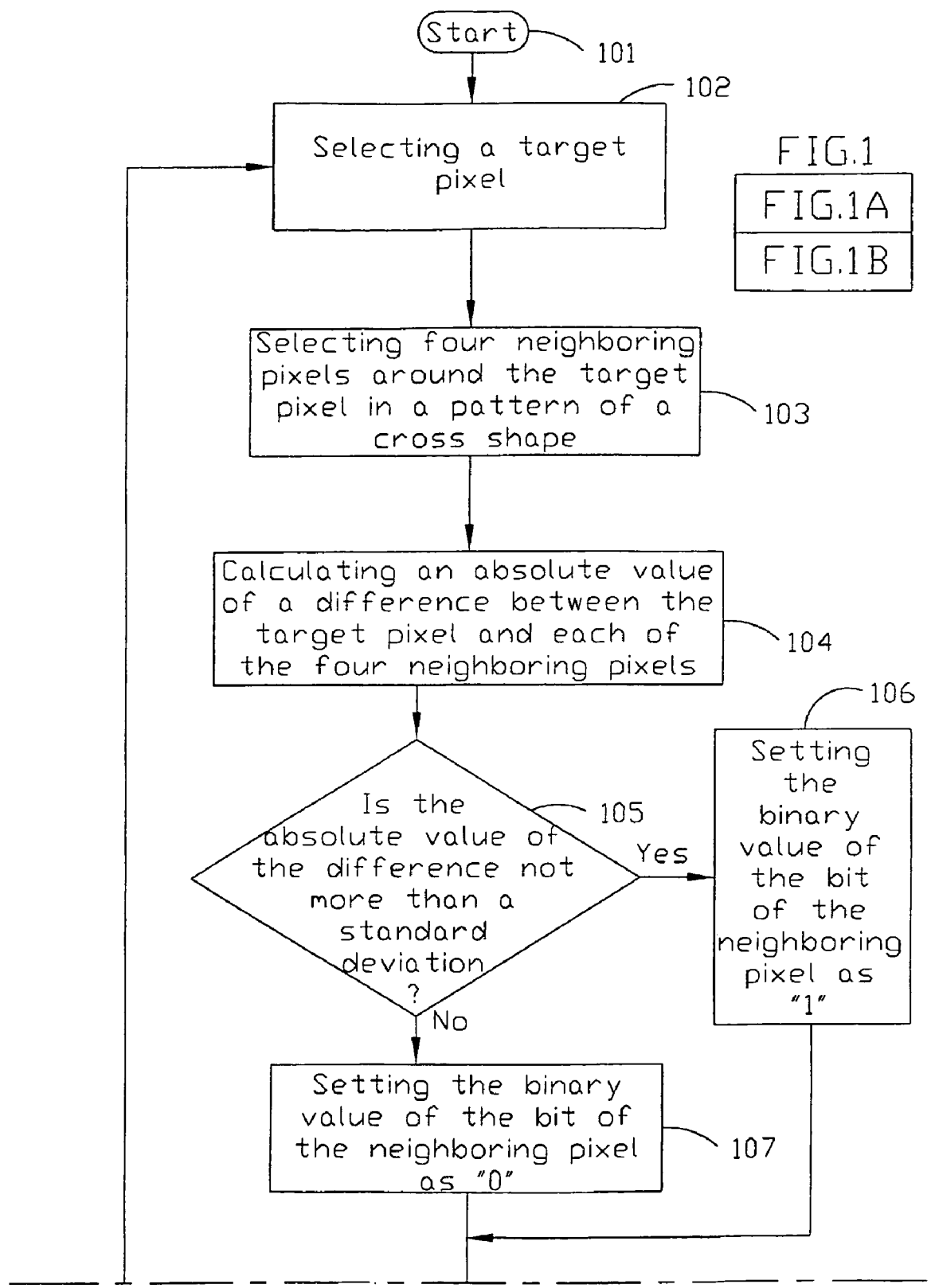
FIGS. 1A and 1B are a flow diagram of a noise filtering process according to one preferred embodiment of the present invention.
Figure 1B:
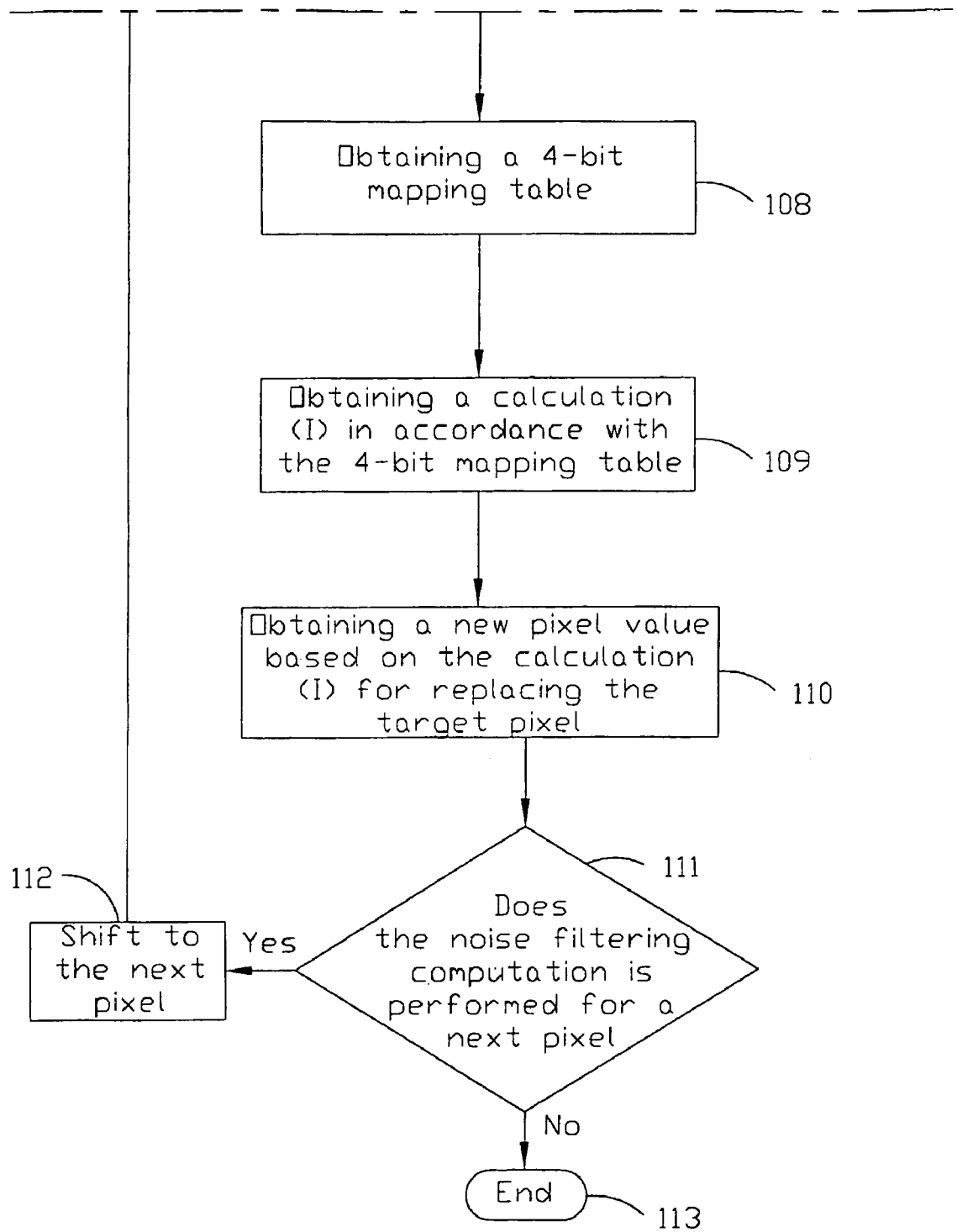

FIGS. 1A and 1B depict a flow diagram illustrating a noise filtering method according to one preferred embodiment of the present invention. The noise filtering method of the preferred embodiment begins at step 101. At step 102, image data are provided and a target pixel $P_0$, i.e. a pixel to be filtered, is selected from the image data. Next, at step 103, referring to FIG. 2A, four neighboring pixels $P_1$, $P_2$, $P_3$, $P_4$ around the target pixel $P_0$ in a pattern of a cross shape is selected. The neighboring pixel $P_1$ belongs to a scan line preceding the scan line the target pixel $P_0$ belongs to. The neighboring pixels $P_2$ and $P_3$ belong to the same scan line with the target pixel $P_0$. The neighboring pixel $P_2$ precedes the target pixel $P_0$ and the neighboring pixel $P_3$ follows the target pixel $P_0$. The neighboring pixel $P_4$ belongs to a scan line follows the scan line the target pixel $P_0$ belongs to.

Then, at step 104, calculating an absolute value of a difference between the target pixel $P_0$ and each of the four neighboring pixels $P_1$, $P_2$, $P_3$ and $P_4$. Next, at step 105, Comparing the absolute value of the difference between the target pixel $P_0$ and any of the neighboring pixels $P_1$, $P_2$, $P_3$ and $P_4$ with a standard deviation. When the absolute value of the difference is not larger than a standard deviation, go to step 106, setting a binary value of a bit corresponding to the neighboring pixel as "1". When the absolute value of the difference is larger than a standard deviation, go to step 107, setting a binary value of a bit corresponding to the neighboring pixel as "0". At step 108, establishing a 4-bit mapping table including the binary values of the neighboring pixels $P_1$, $P_2$, $P_3$ and $P_4$ in accordance with the result generated from step 105 through 107. Referring to table (I) shown in FIG. 3, the 4-bit mapping table established by step 105 through 107 is matched with one case shown in the table (I). That is, the 4-bit condition of the four neighboring pixels $P_1$, $P_2$, $P_3$ and $P_4$ can map to any one of the sixteen cases, case 0 through 15, shown in table (I).

Next, at step 109, a calculation (I) shown in the following is derived from the 4-bit mapping table:

$$X_0' = \frac{\sum_{i=0}^{4} K_i X_i}{\sum_{i=0}^{4} K_i} \quad (I)$$

wherein $X_0$ represents the target pixel value and $X_0'$ represents a new is pixel value for replacing the target pixel value $X_0$, $X_1$ (i=1~4) represents one pixel value of one neighboring pixel $P_i$ (i=1~4) among the four neighboring pixels $P_1$, $P_2$, $P_3$ and $P_4$. $K_1$ (i=0~4) is a weighting coefficient of one of the four neighboring pixels and the target pixel. When the binary value of the neighboring pixel $P_1$ is set as "0", the weighting coefficient $K_1$ thereof is set zero, and the neighboring pixels among the four neighboring pixels having the binary value "1" are provided with equivalent weighting coefficients. Referring to table (II) shown in FIG. 4, showing the weighting coefficients of the target pixel $P_0$ and the four neighboring pixels $P_1$, $P_2$, $P_3$ and $P_4$, respectively mapping each case of table (I). As shown in table (II), when the binary value of each of the neighboring pixels is set "0", the weighting coefficient of the target pixel is the value of 1, see case 0. When the binary value of one of the neighboring pixels is set "1" and the remains are set "0", the weighting coefficient of both of the target pixel and the neighboring pixel is the value of ½, see cases 1, 2, 4, and 8. When the binary value of two of the neighboring pixels is set "1" and the remains are set "0", the weighting coefficient of both of the two neighboring pixels is the value of to ¼ and the weighting coefficient of the target pixel is the value of ½, see cases 3, 5, 6, 9, 10, 12 and 13. When the binary value of one of the neighboring pixels is set "0" and the remaining three having the binary value "1", selecting the two neighboring pixels among the remaining three into the calculation (I), and the weighting coefficient of both of the two neighboring pixels is the value of ¼ and the weighting coefficient of said target pixel is the value of ½, see cases 7, 11 and 14. Referring to tables (I) and (II), it is preferable to select the two neighboring pixels among the three neighboring pixels having binary value "1" belonging to the same scan line with the target pixel to put in calculation (I). For example, see case 7, the two neighboring pixels $P_2$ and $P_3$ among the three neighboring pixels $P_2$, $P_3$ and $P_4$ are selected, and the weighting coefficient of the two neighboring pixels $P_2$ and $P_3$ is the value of ¼. The target pixel has a weighting coefficient of ½ in the case 7. In case that the image data are captured by a scanner, the pixels easily become blurred aligning the direction of the movement of a stepping motor used for moving a scanning head. Therefore, for case 11 with the three neighboring pixels $P_1$, $P_3$ and $P_4$ having binary value "1", it is preferable to select the two neighboring pixels $P_3$ and $P_4$ to put in calculation (I), and the weighting coefficient of each of the two neighboring pixels $P_3$ and $P_4$ is the value of ¼. The target pixel has a weighting coefficient of ½ in the case 11. Furthermore, in case 14 with the three neighboring pixels $P_1$, $P_2$ and $P_4$ having binary value "1", it is preferable to select the two neighboring pixels $P_1$ and $P_2$ to put in calculation (I), and the weighting coefficient of each of the two neighboring pixels $P_1$ and $P_2$ is the value of ¼. The target pixel has a weighting coefficient of ½ in the case 14. When the binary value of each of the four neighboring pixels is set "1", the weighting coefficient of each neighboring pixel is the value of ⅛ and the weighting coefficient of the target pixel is the value of ½, see case 15.

Then, at step 110, calculating a new pixel value $X_0'$ based on the calculation (I) derived from the 4-bit mapping table. The weighting coefficients of the target pixel and the four neighboring pixels are obtained from the 4-bit mapping table. The new pixel value $X_0'$ is replaced for the target pixel value $X_0$. At step 111, determining if the noise filtering computation is going to be performed for a next pixel? If it is yes, go to step 112, shifting to the next pixel, and repeating step 102 through 111. If it is not, go to step 113, completing the noise filtering computation.

In accordance with the foregoing, the present invention can only use the module of shift and adder in hardware to perform the noise filtering process. The complexity of the hardware used therefor is significantly reduced, and the computation time of the present method whether implemented by hardware, software or in a combination of hardware and software is much shorter.

Referring to FIG. 2B, in another preferred embodiment, the four neighboring pixels $P_1$, $P_2$, $P_3$ and $P_4$ around the target pixel $P_0$ in an X-shaped pattern are selected. The noise filtering process is the same with that depicted in FIGS. 1A and 1B. That is, step 101 through 113 is repeated in this preferred embodiment.

The preferred embodiments are only used to illustrate the present invention, it is not intended to limit the scope thereof. Many modifications of the embodiments can be made without departing from the spirit of the present invention.

What is claimed is:

1. A method comprising:
   selecting, using a scanner, a first pixel to be filtered from a first scan line of a plurality of scan lines from image data;
   selecting, using the scanner, one or more pixels from one or more scan lines adjacent to the first scan line;
   determining, using the scanner, an absolute value of a difference between the first pixel and the selected one or more pixels;
   establishing, using the scanner, a mapping table including a plurality of binary values, wherein the plurality of binary values are established based, at least in part, on the absolute value of the difference; and
   replacing, using the scanner, the first pixel according to one or more of the binary values of the mapping table.

2. The method of claim 1, wherein the mapping table comprises a 4-bit mapping table.

3. The method of claim 1, wherein the selected one or more pixels comprise neighboring pixels of the first pixel.

4. The method of claim 3, wherein the neighboring pixels comprise four pixels adjacent to the first pixel.

5. The method of claim 3, further comprising:
   setting a binary value associated with a neighboring pixel to '1' in response to the absolute value of the difference being smaller than a standard deviation; and
   setting a binary value associated with a neighboring pixel to '0' in response to the absolute value of the difference being larger than the standard deviation.

6. The method of claim 3, further comprising selecting one or more other pixels from the first scan line, wherein the selected one or more other pixels also comprise neighboring pixels of the first pixel.

7. The method of claim 6, wherein the neighboring pixels comprise four pixels adjacent to the top, the bottom, and the sides of the first pixel.

8. A method comprising:
   selecting, using a scanner, a first pixel to be filtered from a first scan line of a plurality of scan lines in a set of image data;
   selecting, using the scanner, one or more pixels from one or more scan lines adjacent to the first scan line;
   determining, using the scanner, an absolute value of a difference between the first pixel value and the selected one or more pixels;
   establishing, using the scanner, a mapping table comprising a plurality of binary values, wherein the plurality of binary values are established based, at least in part, on a comparison of absolute value of the difference with a standard deviation; and
   replacing, using the scanner, the first pixel according to one or more of the binary values of the mapping table.

9. The method of claim 8, wherein the mapping table comprises a 4-bit mapping table.

10. The method of claim 8, wherein the selected one or more pixels comprise neighboring pixels of the first pixel.

11. The method of claim 10, wherein the neighboring pixels comprise four pixels adjacent to the first pixel.

12. The method of claim 10, further comprising:
setting a binary value associated with a neighboring pixel to '1' in response to the absolute value of the difference being smaller than the standard deviation; and
setting a binary value associated with a neighboring pixel to '0' in response to the absolute value of the difference being larger than the standard deviation.

13. The method of claim 10, further comprising selecting one or more other pixels from the first scan line, wherein the selected one or more other pixels also comprise neighboring pixels of the first pixel.

14. The method of claim 13, wherein the neighboring pixels comprise four pixels adjacent to the top, the bottom, and the sides of the first pixel.

15. A method, comprising:
obtaining, using a scanner, values for a target pixel and one or more pixels adjacent to the target pixel;
comparing, using the scanner, a value for the target pixel with a value for the one or more pixels adjacent to the target pixel;
setting, using the scanner, binary values for the one or more pixels adjacent to the target pixel based, at least in part, on the comparison;
determining, using the scanner, a weighted average value for the target pixel based, at least in part, on the binary values; and
substituting, using the scanner, the weighted average value for the obtained value of the target pixel.

16. The method of claim 15, wherein the one or more pixels adjacent to the target pixel comprise four pixels adjacent to the target pixel.

17. The method of claim 15, further comprising:
determining an absolute value of the difference between the value of the target pixel and at least one value of the one or more pixels adjacent to the target pixel; and
comparing the determined absolute value to a known value.

18. The method of claim 17, wherein the known value comprises a standard deviation value.

\* \* \* \* \*